United States Patent
Resheff et al.

(10) Patent No.: US 11,182,436 B2
(45) Date of Patent: Nov. 23, 2021

(54) PREDICTING LOCATIONS BASED ON TRANSACTION RECORDS

(71) Applicant: INTUIT INC., Mountain View, CA (US)

(72) Inventors: Yehezkel S. Resheff, Hod HaSharon (IL); Shimon Shahar, Rishon Letziyon (IL); Ido Meir Mintz, Hod HaSharon (IL); Yair Horesh, Hod HaSharon (IL)

(73) Assignee: INTUIT INC., Mountain View, CA (US)

( * ) Notice: Subject to any disclaimer, the term of this patent is extended or adjusted under 35 U.S.C. 154(b) by 54 days.

(21) Appl. No.: 16/863,177

(22) Filed: Apr. 30, 2020

(65) Prior Publication Data

US 2020/0257729 A1    Aug. 13, 2020

Related U.S. Application Data

(63) Continuation of application No. 16/012,918, filed on Jun. 20, 2018, now Pat. No. 10,678,865.

(51) Int. Cl.
*G06F 16/00* (2019.01)
*G06F 16/907* (2019.01)
*G06F 16/18* (2019.01)
*G06F 16/901* (2019.01)
*G06F 40/295* (2020.01)

(52) U.S. Cl.
CPC ........ *G06F 16/907* (2019.01); *G06F 16/1805* (2019.01); *G06F 16/9024* (2019.01); *G06F 40/295* (2020.01)

(58) Field of Classification Search
CPC .................................................... G06F 16/907
See application file for complete search history.

(56) References Cited

U.S. PATENT DOCUMENTS

| 2008/0017720 A1 | 1/2008 | Kranzley |
| 2009/0240592 A1 | 9/2009 | Baumgart et al. |

*Primary Examiner* — Ajith Jacob
(74) *Attorney, Agent, or Firm* — Patterson + Sheridan, LLP

(57) ABSTRACT

Certain aspects of the present disclosure provide techniques for predicting a location based on transaction record data. An example technique includes obtaining a first set of transaction records and determining a merchant associated with each transaction record. The example further includes based on the merchant, determining and appending a branch identifier to each transaction record associated with the merchant to generate a first set of extended transaction records. The example further includes creating a consumption graph based on the first set of extended transaction records and determining an estimated location based on the consumption graph. The example further includes determining a precise point location based on the estimated location.

20 Claims, 5 Drawing Sheets

PREDICTING LOCATIONS BASED ON TRANSACTION RECORDS

CROSS-REFERENCE TO RELATED APPLICATIONS

This application is a continuation of pending U.S. patent application Ser. No. 16/012,918, titled "Predicting Locations Based on Transaction Records" filed on Jun. 20, 2018, which is incorporated herein by reference in its entirety.

INTRODUCTION

Aspects of the present disclosure generally relate to a method and system of determining a location. In particular, embodiments of the present disclosure involve using transaction records to predict a location of a transaction.

BACKGROUND

Transaction records are frequently collected by organizations to perform data analysis. However, the collected transaction records rarely comply with any one standard format. Often, the information in one transaction record may be different from the information in another transaction record.

Transaction records that include location information may be utilized by an organization for many practical applications. Unfortunately, because there is no standardization in transaction records and because many transaction records do not include location information, only a fraction of transaction records (which include location information) may be usable for location-based analysis, decision making, metrics, etc.

In order to maximize the utility of all of the transaction records collected by an organization, a solution is needed to determine the location information of the transactions records that do not include any location information.

Conventional solutions may include individually reviewing and analyzing each transaction record to determine information that may be used to identify the location information of where a transaction occurred. For example, an individual associated with an organization collecting transaction records may review and analyze transaction records one at a time, looking for information such as a street address or a branch identifier associated with the transaction record, which may then be associated with a location. However, such methods are slow, tedious, inefficient, prone to error, and lack practical ways of automation. Conventional automated solutions may rely on strict formatting requirements to determine location information, and may be inflexible and prone to error when analyzing transaction records of many different formats. In such cases, simply changing the order of data may be enough to render these conventional automated methods dysfunctional.

Further, even when location information is included in a transaction record, it is not always complete. For example, the street address in the transaction record may be incomplete and missing information such as city and state, or a transaction record may include a city but no street address. In another example, a branch identifier may be included, but it may be an internal number for the merchant associated with the transaction, which does not easily lead to any location by any form of analysis.

Therefore, a solution is needed to determine location information based on transaction records in order to utilize the transaction records in various practical applications.

BRIEF SUMMARY

Certain embodiments provide a method for determining a location based on transaction data. The method generally includes obtaining a first set of transaction records associated with a first time period, wherein each transaction record comprises a user identification, a merchant identification, and a description string. The method further includes determining a merchant for each respective transaction record in the first set of transaction records based on a respective merchant identification. The method further includes analyzing a plurality of description strings associated with the first set of transaction records to generate one or more branch identification patterns for each merchant. The method further includes creating a first set of extended transaction records by appending branch identifiers to transaction records in the first set of transaction records where a branch identification pattern of the one or more branch identification patterns identifies a branch identifier associated with the respective merchant in a description string of a transaction record and discarding transaction records in the first set of transaction records where none of the one or more branch identification patterns identifies a branch identifier in a description string of a transaction record. The method further includes creating a consumption graph based on the first set of extended transaction records. The method further includes determining an estimated location associated with one of the first set of extended transaction records based on the consumption graph. The method further includes, based on the estimated location, determining a precise point location.

Other embodiments provide a non-transitory computer-readable storage medium comprising instructions that, when executed by one or more processors, cause the one or more processors to perform a method for determining a location based on transaction data. The method generally includes obtaining a first set of transaction records associated with a first time period, wherein each transaction record comprises a user identification, a merchant identification, and a description string. The method further includes determining a merchant for each respective transaction record in the first set of transaction records based on a respective merchant identification. The method further includes analyzing a plurality of description strings associated with the first set of transaction records to generate one or more branch identification patterns for each merchant. The method further includes creating a first set of extended transaction records by appending branch identifiers to transaction records in the first set of transaction records where a branch identification pattern of the one or more branch identification patterns identifies a branch identifier associated with the respective merchant in a description string of a transaction record and discarding transaction records in the first set of transaction records where none of the one or more branch identification patterns identifies a branch identifier in a description string of a transaction record. The method further includes creating a consumption graph based on the first set of extended transaction records. The method further includes determining an estimated location associated with one of the first set of extended transaction records based on the consumption graph. The method further includes, based on the estimated location, determining a precise point location.

Other embodiments provide a system comprising a processor and a memory storing instructions which when executed by the processor perform an operation for determining a location based on transaction data. The operation generally includes obtaining a first set of transaction records associated with a first time period, wherein each transaction record comprises a user identification, a merchant identification, and a description string. The operation further includes determining a merchant for each respective transaction record in the first set of transaction records based on a respective merchant identification. The operation further includes analyzing a plurality of description strings associated with the first set of transaction records to generate one or more branch identification patterns for each merchant. The operation further includes creating a first set of extended transaction records by appending branch identifiers to transaction records in the first set of transaction records where a branch identification pattern of the one or more branch identification patterns identifies a branch identifier associated with the respective merchant in a description string of a transaction record and discarding transaction records in the first set of transaction records where none of the one or more branch identification patterns identifies a branch identifier in a description string of a transaction record. The operation further includes creating a consumption graph based on the first set of extended transaction records. The operation further includes determining an estimated location associated with one of the first set of extended transaction records based on the consumption graph. The operation further includes, based on the estimated location, determining a precise point location.

The following description and the related drawings set forth detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
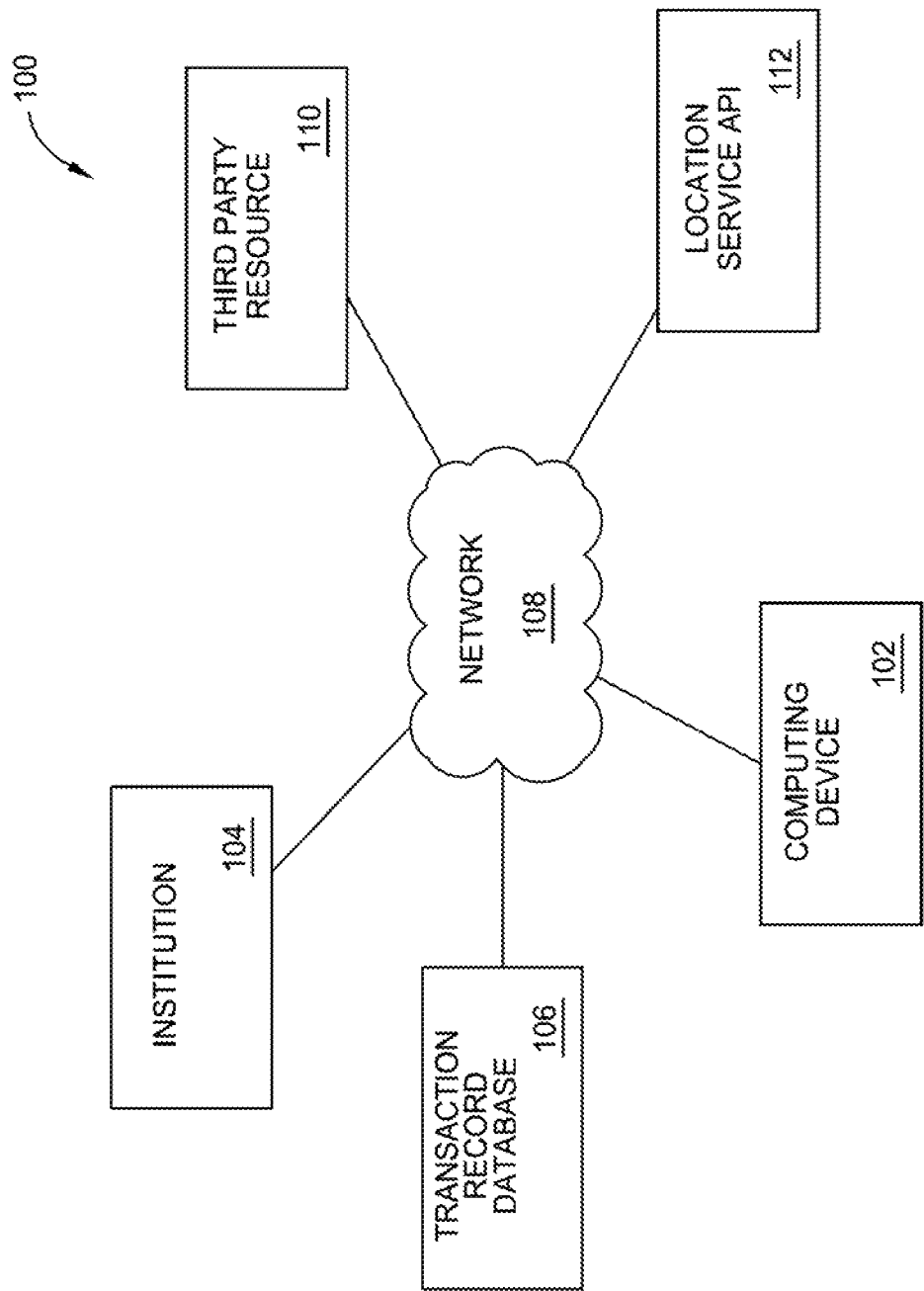
FIG. 1 depicts an example computing environment for predicting location information based on transaction records, according to at least some embodiments.

Aspects of the present disclosure provide apparatuses, methods, processing systems, and computer readable mediums for determining a location based on transaction records.

An organization can obtain transaction records from one or more intuitions, including banks, credit card companies, and insurance companies to name just a few. The organization obtaining transaction records can use the transaction records in one or more processes, products, and services offered by the organization to one or more users. Knowing the location of transactions can provide benefits to an organization. For example, the location information may be utilized in different practical applications including transaction-based soft fraud detection and business analytics. With regard to soft fraud detection, by determining the location information for transaction records that do not have location information, a soft fraud detection system may be able to detect and identify fraud occurring in more locations and also with a greater degree of accuracy. With regard to business analytics, determining the location information for transaction records allows for a greater degree of insight into business planning. By knowing where transactions are taking place, a determination may be made such as, for example, where to open a new store branch.

However, the transaction records obtained by an organization are often not in a standard format. For example, the information in a first transaction record may be different from the information in a second transaction record and a third transaction record. A first transaction record may include a transaction date, a transaction amount, and a branch identifier. The second transaction record may include a transaction date, a transaction amount, a branch identifier, and location information. The third transaction record may include a transaction date, a transaction amount, and location information. As such, not all transaction records include the same type of information. Additionally, transaction records are not limited to the types of information described and may include other types of information associated with a transaction such as transaction time, transaction item, and method of payment.

Furthermore, the format of the information within each transaction record may be different. Continuing the example, the second transaction record may include a transaction date in a "MM/DD/YYYY" format (e.g., "06/01/2018"), and the third transaction record may include a transaction date in a "MONTH DATE, YEAR" format (e.g., Jun. 1, 2018). Also, the second transaction record may include a street address as the location information, and the third transaction record may include a set of grid coordinates as the location information. As such, not all transaction records include the same format of information.

In order for an organization to utilize transaction records without location information, the organization can use the transaction records of one or more merchants with known location information in the associated transaction records to determine an estimated location associated with a transaction record that does not include location information. For example, the estimated location information can be determined based on shared customers between one or more merchants with known location information in the associated transaction records and a merchant with unknown location information in the associated transaction records. Based on the determined estimated location, a precise point location can be determined for transaction records associated with a merchant with unknown location information. For example, a query can be made to a location service application programming interface (API) with the estimated location and the merchant as input to generate an output of a precise point location.

The underlying assumption for determining location information based on transaction records is that customers tend to make regular transactions in a localized area. For example, a customer may make transactions at a grocery store, coffee shop, and gas station all relatively proximate to each other. The grocery store, coffee shop, and gas station are assumed to be in a localized area and close to each other in terms of both time and distance. This is so because it would not make sense for a customer to travel far away (e.g., outside of a localized area) in terms of time and distance to make regular transactions at each location.

In addition to practical applications associated with determining location information based on transaction records, a single instance of determining the location information allows for the location information to be used in a number of different applications, thereby allowing an organization to reuse the location information rather than re-generating the location information.

Example Computing Environment for Predicting a Location

FIG. 1 depicts an example computing environment 100 for predicting location information based on transaction records. A computing device 102 may be associated with an organization, such as a business. The computing device 102 may be configured to predict location information based on transaction records collected by the organization. The computing device 102 may include a server, tablet, smartphone, laptop, and desktop computer.

The organization may collect transaction record data from one or more institutions 104 including a bank, credit card company, and insurance company. The transaction record data collected may be stored in a transaction record database 106 associated with the organization.

The computing device 102 may obtain a first set of transaction record data via a network 108 from the transaction record database 106. The network 108 may include local area networks (LANs), wireless LANs (WLANs), wide area networks (WANs), and wireless WANs (WWANs), and other technology now known or later developed capable of transmitting data between computing systems.

The first set of transaction record data obtained may be associated with transactions made in a first time period. In comparison to obtaining all of the transaction records collected from the transaction record database 106, obtaining the first set of transaction record data may reduce processing time associated with predicting the location information. However, if necessary to predict location information, one or more additional sets of transaction records may be obtained by the computing device 102 from the transaction record database 106.

In some examples, the obtained transaction records in the transaction record data comprise a user identification, a merchant identification, and a description string. The computing device 102 may be configured to process the obtained transaction records to generate extended transaction records. An extended transaction record comprises a user identification, a merchant identification, a description string, and a branch identifier. The extended transaction records may be used to generate a consumption graph. The consumption graph comprises nodes and edges. A node of the consumption graph may be a known location node or an unknown location node. The node of the consumption graph may be based on transaction records associated with the same merchant identification and branch identifier. An edge may be based on a shared number of customers, equal weight, statistical model, time, or some other attribute that could be used to compare two locations where transactions may occur, between a known location node and an unknown location node.

In some implementations, the location information associated with the known location node may be determined based on external or other third party resources 110. In other implementations, the location information associated with the known location node may be based on the description string of a transaction record including the location information. Based on the known location nodes and connecting edges, an estimated location may be determined for the unknown location node. Once the estimated location for the unknown location node is determined, the estimated location information may be used to determine a precise point location by querying a location service API 112 with the estimated location and the merchant identification. A precise point location may then be displayed via the computing device 102 to a user for confirmation of the determined location.

Example Method of Predicting a Location

Figure 2:
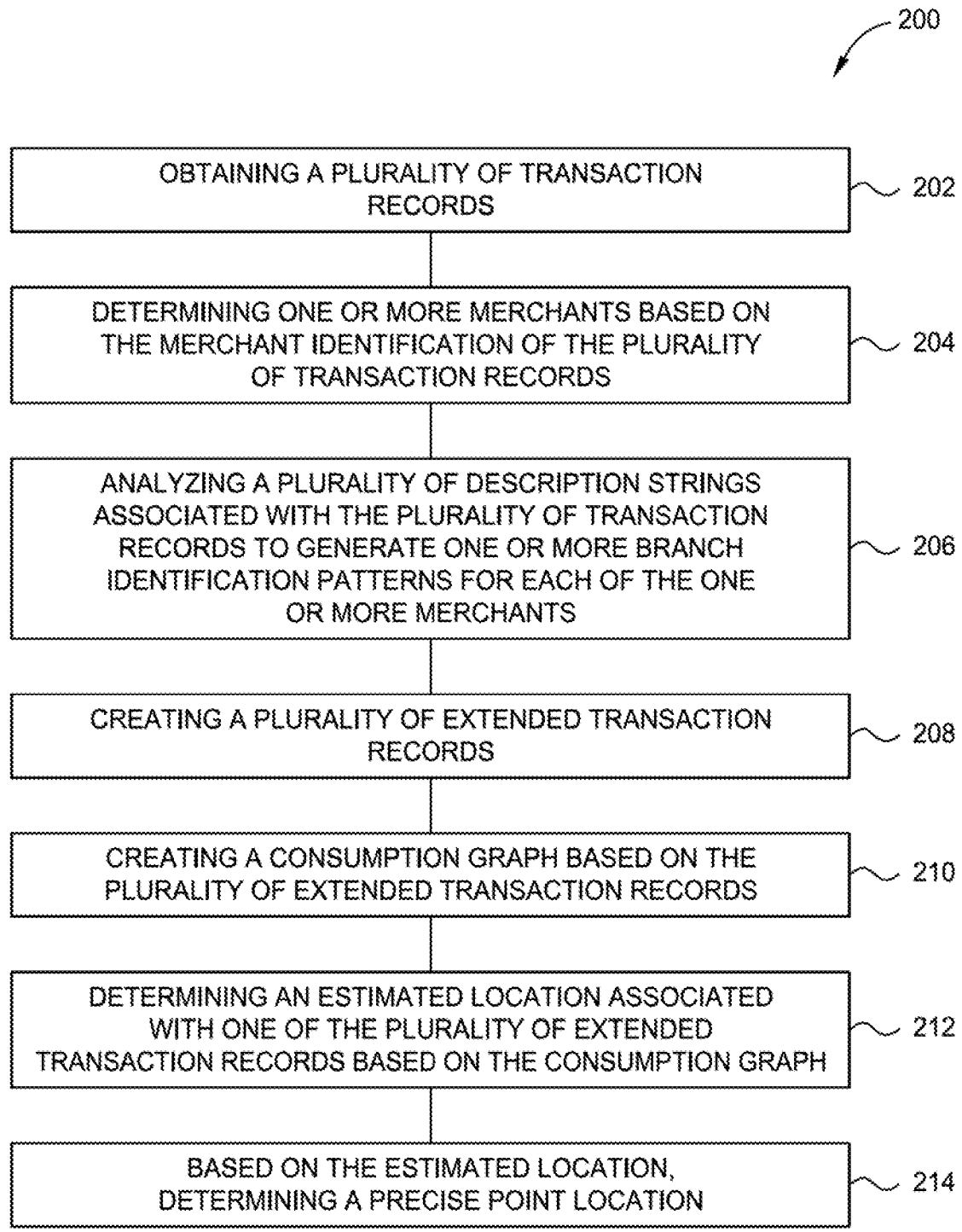
FIG. 2 depicts an example method of predicting location information based on transaction records, according to at least some embodiments.

FIG. 2 depicts an example method 200 of determining location information based on transaction records.

At step 202, a first set of transaction records are obtained associated with a first time period. Obtaining the first set of transaction records may prevent expending more computing resources and processing time than necessary for determining location information based on transaction records. In this example, a transaction record in the first set of transaction records may comprise a user identification, a merchant identification, and a description string. User identification may include a user name and account number. Merchant identification may include a merchant name and account number. Description string may include city information, street address, branch identifier, transaction time, transaction date, and transaction amount. The transaction record information may be stored in a tabular record. For example, the transaction records may be stored in vectors, database rows, and XML files.

In some implementations, the transaction records may be collected from third party institutions and stored in a database. For example, the third party institutions may include banks, credit card companies, and insurance companies to name a few.

At step 204, one or more merchants are determined based on the merchant identification of the first set of transaction records. For example, a merchant may be determined based on information stored in the merchant identification segment of the transaction record. Continuing the example, the information stored in the merchant identifier may be a name used to identify the merchant associated with the transaction record. Merchants may include, for example, retailers, wholesalers, and service providers.

At step 206, a plurality of description strings associated with the first set of transaction records are analyzed to generate one or more branch identification patterns for each of the one or more merchants.

In some implementations, the one or more branch identification patterns may be regular expressions. A regular expression is a search pattern comprising a sequence of characters for identifying a specific pattern. For example, the branch identification pattern may comprise a sequence of characters for identifying specific branch identifiers of description strings in the first set of transaction records.

In some implementations, a branch identification pattern may be generated manually based on the transaction records associated with the merchant. In other implementations, generation of a branch identification pattern may be automated.

At step 208, a first set of extended transaction records are created. For example, an extended transaction record may be created by appending a branch identifier to the transaction record associated with the determined merchant.

In some implementations, the branch identifier may be determined using a branch identification pattern. The branch identification pattern may be applied to the first set of transaction records associated with a merchant. The application of the branch identification pattern may determine the first set of transaction records associated with a particular branch of the merchant. The branch identifier may comprise, for example, a store identification number.

In some implementations, when the branch identifier is a store identification number, a location may be determined based on the store identification number. For example, if the store identification number is determined as 1234, then third party resources, such as third party databases, may be queried to determine the location associated with the transaction record. Continuing the example, a third party database may provide corresponding location information based on the store identification number. Upon determining the corresponding location information, all of the transaction records associated with a merchant that include the store identification number will be appended to the first set of transaction records to create a first set of extended transaction records. Furthermore, the extended transaction records associated with the determined branch identifier with known location information will comprise a known location node.

In other implementations, the branch identifier may be determined using the branch identification pattern, but corresponding location information may not be available from third party databases. Upon determining there is no corresponding location information associated with the branch identifier, the extended transaction records associated with that branch identifier will comprise an unknown location node.

In still other implementations, no branch identifiers may be determined after applying branch identification patterns. When no branch identifiers can be determined, the associated transaction records may be discarded from consideration during a process for predicting locations of transactions with certain attributes (such as transactions including certain identifiers). Discarding the transaction records with no branch identifiers will reduce the overall number of transaction records to be analyzed, which in turn will cause the process of determining a location based on transaction records to be faster and more accurate.

At step 210, a consumption graph based on the first set of extended transaction records is created. The consumption graph may include nodes associated with merchants connected by edges. Each node in the consumption graph comprises extended transaction records associated with the same merchant identification and the same branch identifier. Furthermore, the consumption graph may include known location nodes as well as unknown location nodes.

Though not depicted in FIG. 2, in some embodiments, a total number of customers associated with each node may be determined. For example, the total number of customers associated with a node may be determined based on the associated extended transaction records. Continuing the example, the extended transaction records associated with customers that have only one transaction record at a particular node are discarded. These particular extended transaction records are discarded based on the assumption that a customer makes regular transactions in a localized area. A single transaction record for a customer at a particular location for the merchant would not be consistent with determining location based on shared user behavior and would instead be indicative of anomalous behavior.

Each edge of the consumption graph may be defined as a relationship between each unique pair of nodes. For example, a defined relationship can be based on a percentage of total shared customers that have extended transaction records associated with each node in a unique pair of nodes. A unique pair of nodes may comprise a first location node and a second location node. For example, the first location node may be a known location node and the second location node may be an unknown location node.

At step 212, estimated location information associated with one of the first set of extended transaction records is determined based on the consumption graph.

In some implementations, the estimated location information of an unknown location node may be determined based on the known location nodes in the consumption graph. The number of known location nodes for determining the estimated location information of an unknown location node is based on a percentage of shared customers between each known location node and the unknown location node. The percentage of shared customers may indicate substantial customer sharing between the two nodes. Additionally, the number of known location nodes for determining the estimated location information of an unknown location node is dynamic.

For example, the shared customer percentages may be low between each known location node and the unknown location node, so a greater number of known location nodes may be needed in determining the estimated location information for the unknown location node. For example, if there are four known location nodes, each with a shared customer percentage of 3%, 3.5%, 2%, and 1.8% respectively with the unknown location node, then additional known location nodes may be included in the determination of the estimated location information of the unknown location node.

Continuing the example, the shared customer percentages may be high between each known location node and the unknown location node, so a fewer number of known location nodes may be needed in determining the estimated location information for the unknown location node. For example, if there are three known location nodes, each with a shared customer percentage of 35%, 40%, and 42%, respectively with the unknown location node, then no more additional location nodes will be needed in the determination of the estimated location information of the unknown location node.

After determining the number of known location nodes based on the shared customer percentages, the estimated location information of the unknown location node may be determined. In some embodiments, the estimated location is based on UTM grid coordinates associated with each of the known location nodes and the edge connecting each known location node and unknown location node.

In some implementations, the edge may comprise a weighted value based on a percentage of total shared customers that have transaction records associated with the first location node and the second location node. The weighted value may also be based on a time and/or distance factor.

For example, there may be five location nodes. Of the five location nodes, there are four known location nodes and one unknown location node. A weight value for each edge is determined based on the percentage of shared customers between each known location node and the unknown location node.

Continuing the example, based on the extended transaction records, it may be determined that the first known location node and the unknown location node has 35% shared customers, the second known location node and the unknown location node has 25% shared customers, the third known location node and the unknown location node has 10% shared customers, and the fourth known location node and the unknown location node has 30% shared customers.

Based on the percentages of shared customers, the weight values defining the relationship between the first known location node and the unknown location node is 35%, the second known location node and the unknown location node is 25%, the third known location node and the unknown location node is 10%, and the fourth known location node and the unknown location node is 30%. In some embodiments, the shared percentages may be normalized so that total weight coefficient value equals 1. In other embodiments, the shared percentages may not be normalized.

In other implementations, the edge may comprise an equal weighted value based on the number of known location nodes. For example, there may be five location nodes. Of the five locations nodes, there are four known location nodes and one unknown location. An equal percentage of shared customers is assumed between each known location node and the unknown location. A total weight value of 1 is divided by the total number of known location nodes, which in this example is four known location nodes. The equal weight value of 25% is determined for defining the relationship between each known location node and the unknown location node.

In still other implementations, the edge weight may be further adjusted or based on a time factor. An edge weight may be given a greater weight value if, for example, it is determined that the shared transactions took place during afternoon rush hour on a weekday. In comparison, an edge weight may be given a lesser edge weight value if, for example, it is determined that the shared transactions took place at 2 am on a weekday.

In some embodiments, the Universal Transverse Mercator (UTM) grid coordinate system is used when determining estimated location information. The UTM grid coordinate system is particularly convenient for determining the estimated location information because it is easy to perform mathematical operations based on UTM grid coordinates. The estimated location is determined based on the UTM grid coordinates of the known location nodes and the weight values of the edges. By applying weighting factors from the edges between nodes to locations of known nodes, an estimated location may be generated as UTM grid coordinates for an unknown location node.

In another embodiment, the edge may be defined by a statistical model of customer sharing based on distance. For example, the statistical model may indicate a certain percentage or percentage range of shared customer given a certain distance between two known location nodes. Continuing the example, if the distance between two known location nodes is 1 mile, then the statistical model may indicate the shared percentage of customers is between 15% and 18%. If the distance between two known location nodes is 2 miles, the statistical model may indicate the shared percentage of customers is between 10% and 13%.

Using the statistical model, a distance between a known location node and an unknown location node may be determined based on the shared percentage of customers. For example, if there are 12% of shared customers between the known location node and the unknown location node, using the statistical model, it can be determined that the distance between the known location node and the unknown location node is 2 miles.

The estimated location information determined for each unknown location node may also be associated with a dynamic percentage of error. For example, if few known location nodes determined the estimated location information of the unknown location node, the percentage of error may be higher in comparison to if more known location nodes determined the estimated location information.

In some embodiments, more than one estimated location may be determined based on the first set of transaction records. For example, the statistical model may determine the distance between the known location node and the unknown location node to be 2 miles. However, the 2 mile distance between the known location node and the unknown location node may result in the estimated location being mapped to two different, yet neighboring, zip codes. Other examples of estimated locations include cities, states, and landmarks. If more than one estimated location is determined, a second set of transaction records associated with a second time period may be obtained. The second set of transaction records can be combined with the first set of transaction records. Continuing the example, the second set of transaction records can narrow the determination of the estimated location based on additional shared customer information, additional known nodes for determining estimated location, or other additional information from the second set of transaction records.

Obtaining additional sets of transaction records can continue until a specific threshold is reached. For example, the threshold may include retrieving up to a certain number of sets of transaction records and retrieving transaction records from a certain time period. If upon reaching the threshold there is still more than one estimated location determined for an unknown location node, then the transaction records associated with the unknown location node can be discarded.

In some embodiments, no estimated location may be determined based on the first set of transaction records. If no estimated location is determined, then a second set of transaction records associated with a second time period may be obtained. This may continue until a specific threshold is reached, and if still no estimated location can be determined, then the transaction records associated with the unknown location node can be discarded.

At step 214, upon determining the estimated location, a precise point location is determined. For example, based on the UTM grid coordinates of the estimated location, a location service API may be queried with the associated merchant identification information and the estimated location information to determine the precise point location. For example, a query may be formed with a certain language construct such as "[merchant name] near [estimated UTM grid coordinates]" and a location service API may return one or more exact locations of merchants near those grid coordinates. In some cases, the closest returned merchant location may be selected as the precise point location.

In order to save computation time and scale the process of determining location based on transaction records, a location service API can be queried with rough estimate location information. Continuing the example, rough estimate location information can be a query input with the merchant identification to the location service API to determine a precise point location of an unknown location node. Rough estimate location information includes a zip code, neighborhood, city, state, and landmark. For example, a query may be formed with a certain language construct such as "[merchant name] near [zip code]" and a location service API may return one or more exact locations of merchants near or within the zip code. In some cases, the closest returned merchant location may be selected as the precise point location.

In some implementations, using the rough estimate location such as zip code and the merchant identification of the unknown location, a precise point location of the unknown location node can be determined without having to consume additional resources to compute UTM grid coordinates of the estimated location. In other implementations, using the rough estimate location information and the merchant identification may fail to provide a single precise point location. In such implementations, a more accurate estimated location may need to be determined first, such as UTM grid coordinates.

Figure 3A:
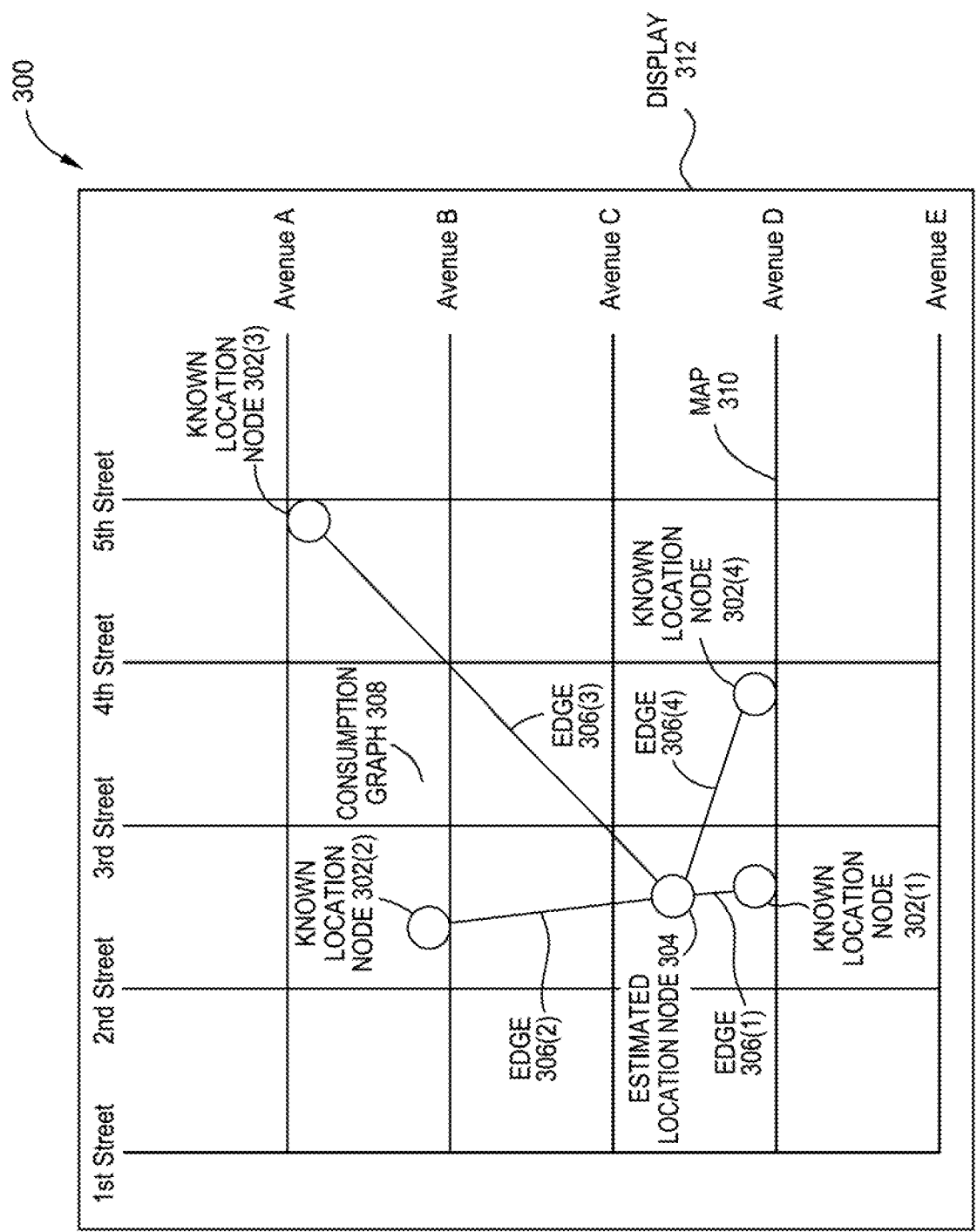
FIG. 3A depicts an example determination of a predicted estimated location based on transaction records on a display of a computing device, according to at least some embodiments.
Figure 3B:
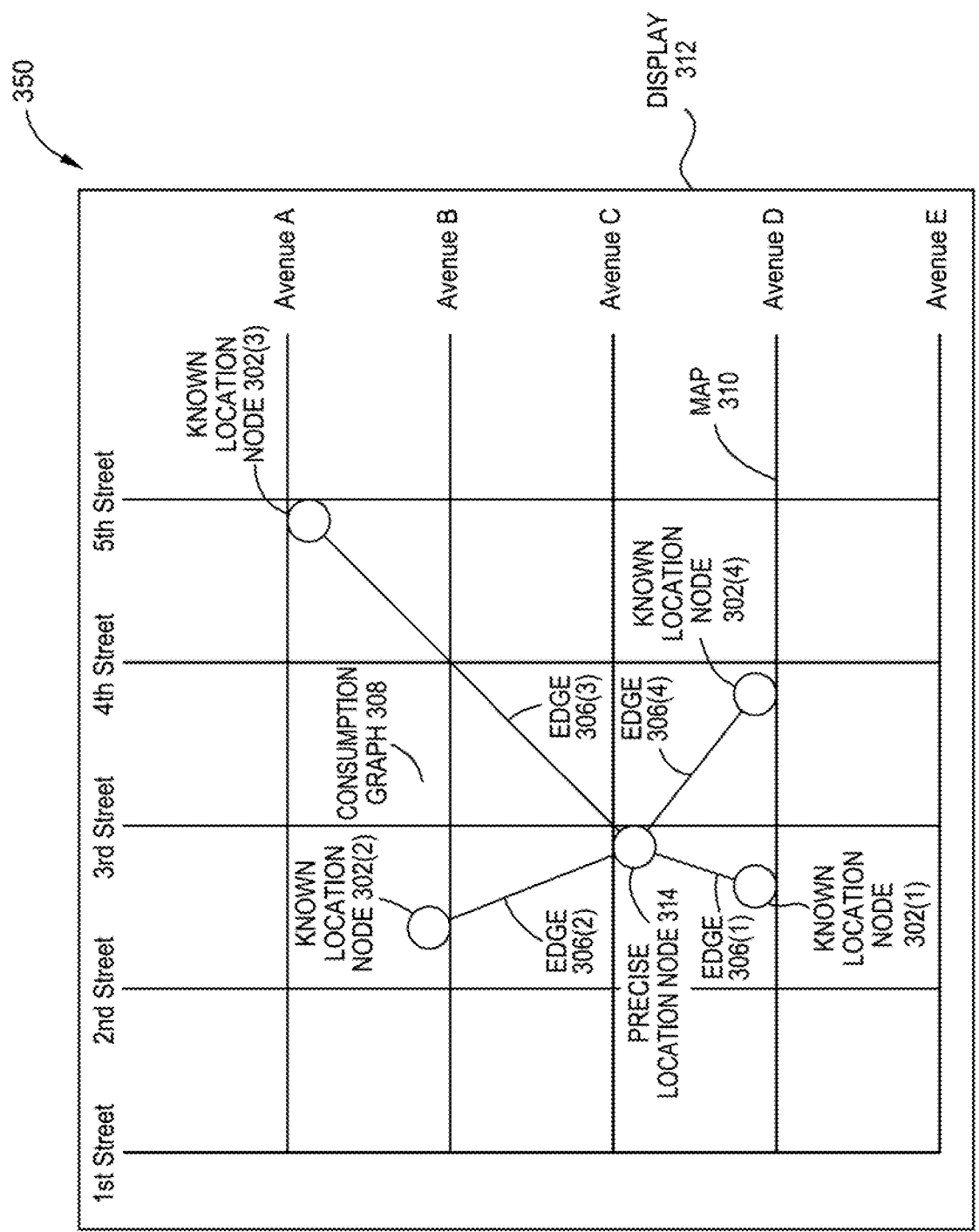
FIG. 3B depicts an example determination of a predicted precise point location based on the predicted estimated location on a display of a computing device, according to at least some embodiments.

In some embodiments, the method further comprises overlaying the consumption graph on a map, for example on a display of an electronic device, such as depicted for example in FIGS. 3A and 3B. By overlaying the consumption graph on a map on a display, a user can confirm the determined location.

Example of Displaying an Estimated Location

FIG. 3A depicts an example determination 300 of estimated location information based on transaction records on a display of a computing device. In the example determination 300, the following nodes have been determined: a first known location node 302(1), a second known location node 302(2), a third known location node 302(3), and a fourth known location node 302(4). Additionally, an estimated location node 304 is determined for an unknown location node based on the known location nodes 302 and connecting edges 306.

The number of known location nodes for determining the estimated location information of an unknown location node may vary depending on the percentage of shared customers between each known location node and the unknown location node. For example, in urban areas where there is a high number of merchants, there may be a low percentage of shared customers between each known location node and the unknown location node (e.g., because customers have more choices), so the number of known location nodes for determining estimated location information for an unknown location node may be greater. In comparison, in rural areas where there are a few number of merchants, there may be a high percentage of shared customers between each known location node and the unknown location node (e.g., because customers have fewer choices), so the number of known location nodes for determining estimated location information for an unknown location node may be fewer relative to the number of known location nodes in urban areas.

As depicted, each known location node 302(1), 302(2), 302(3), and 302(4) is connected to an estimated location node 304 by edges 306(1), 306(2), 306(3) and 306(4), respectively. The edge 306 is defined between each pairing of the unknown location node and the known location nodes 302(1), 302(2), 302(3), and 302(4).

In some implementations, the edges 306(1), 306(2), 306 (3) and 306(4) connecting each known location node and the unknown location node may be based on a percentage of customers that have transaction records at both the unknown location node and the respective known location node 302 (1), 302(2), 302(3), and 302(4).

As depicted in FIG. 3A, the edge 306(1) connecting the unknown location node and the first known location node 302(1) may be defined by 35% shared customers. The edge 306(2) connecting the unknown location node and the second known location node 302(2) may be defined as 25% shared customers, the edge 306(3) connecting the unknown location node and the third known location node 302(3) may be defined as 10%, and the edge 306(4) connecting the unknown location node and the fourth known location node 302(4) may be defined as 30%.

Based on the defined edges 306 between the unknown location node and the known location nodes 302(1), 302(2), 302(3), and 302(4), estimated location information of the unknown location node may be determined based on the weight values associated with each edge 306 and the UTM grid coordinates of the known location nodes 302.

As depicted on the display 312, the first known location node 302(1) has an address of 250 Avenue D. The second known location node 302(2) has an address of 200 Avenue B. The third known location node 302(3) has an address of 100 5$^{th}$ Street. The fourth known location node 302(4) has an address of 370 Avenue D.

In some implementations, the estimated location determined may be based on the UTM grid coordinates of each known location node 302 and the weight value of each edge connecting each known location node 302 and the unknown location node. For example, the UTM grid coordinates of each known location node may be determined based on the street address information. In some examples, a third party service may be queried, for example, through a location service API, to convert the street addresses to UTM grid coordinates. Continuing the example, the UTM grid coordinates of the unknown location node may then be determined based on the UTM grid coordinates of each known location node and the weight value associated with the connecting edge, resulting in the estimated location node 304 on the consumption graph 308.

Additionally, the resulting UTM grid coordinates of the estimated location node 304 may be indicative of the estimated location information within a margin of error. The margin of error varies depending on the number of known location nodes 302 used to calculate the estimated location node 304 for an unknown location node.

In some implementations, the estimated location may be calculated based on equal edge weights. For example, the edge 306(1) connecting the unknown location node and the first known location node 302(1) may be defined as 25%. The edge 306(2) connecting the unknown location node and the second known location node 302(2) may be defined as 25%, the edge 306(3) connecting the unknown location node and the third known location node 302(3) may be defined as 25%, and the edge 306(4) connecting the unknown location node and the fourth known location node 302(4) may be defined as 25%. Each edge has a weight value of 25%, and the total weight value of the edges is equal to 1.

Based on the UTM grid coordinates for each known location node 302 and the weight value for the edge 306 connecting each known location node 302 to the unknown location node, the resulting UTM grid coordinates may indicate the estimated location information for the estimated location node 304 within a certain margin of error.

In some implementations, the estimated location node 304 may be confirmed by the user. For example, upon determining the estimated location information, the consumption graph with the known location nodes 302 and the estimated location node 304 can be overlaid on a map 310. The display 312 will display both consumption graph 308 and map 310. If the placement of the known location nodes 302 on the map 310 is consistent with the known location information associated with the respective known location nodes, then the placement of the estimated location node 304 may confirm the associated estimated location information. In other implementations, a user may be prompted to confirm the estimated location information associated with the estimated location node 304 based on the consumption graph 308 and displayed map 310. The user may determine based on reviewing the placement of consumption graph nodes on the map 310 whether the estimated location information is accurate.

Example of Displaying a Precise Point Location Based on an Estimated Location FIG. 3B depicts an example determination 350 of a precise point location based on the estimated location on a display of a computing device. The estimated location determined can comprise a UTM grid coordinate, zip code, neighborhood, landmark, city, and state. The estimated location information can be used to query a location service API. In some implementations, the location service API can be queried with the merchant identification upon determining a rough estimate of the location associated with the unknown location node such as zip code, neighborhood, city, state, and landmark. Querying the location service API with a rough estimate would reduce computation power and resources consumed to determine an estimated location such as UTM coordinate based on shared customers. In other implementations, the location service API can be queried with the merchant identification and determined UTM coordinates.

After determining the precise point location of the estimated location node, the precise point location can be displayed on the display 312 of a computing device as the precise location node 314. Additionally, the precise point location associated with the precise location node 314 can be appended to the transaction records and classify the node as a known location node for subsequent determinations of location based on transaction records.

Additionally, when the precise point location is displayed on the display 312, users can provide feedback via the display 312. For example, if the precise point location of the precise location node 314 for associated extended transaction records is found to be inaccurate, for example, based on the estimated location information, then the user may indicate this inaccuracy via the display 312 of the computing device as well as provide corrections. The feedback provided by the user can recalibrate the determination of the estimated and precise point locations for subsequent determinations of location information based on transaction records.

Example of Location Prediction System

Figure 4:
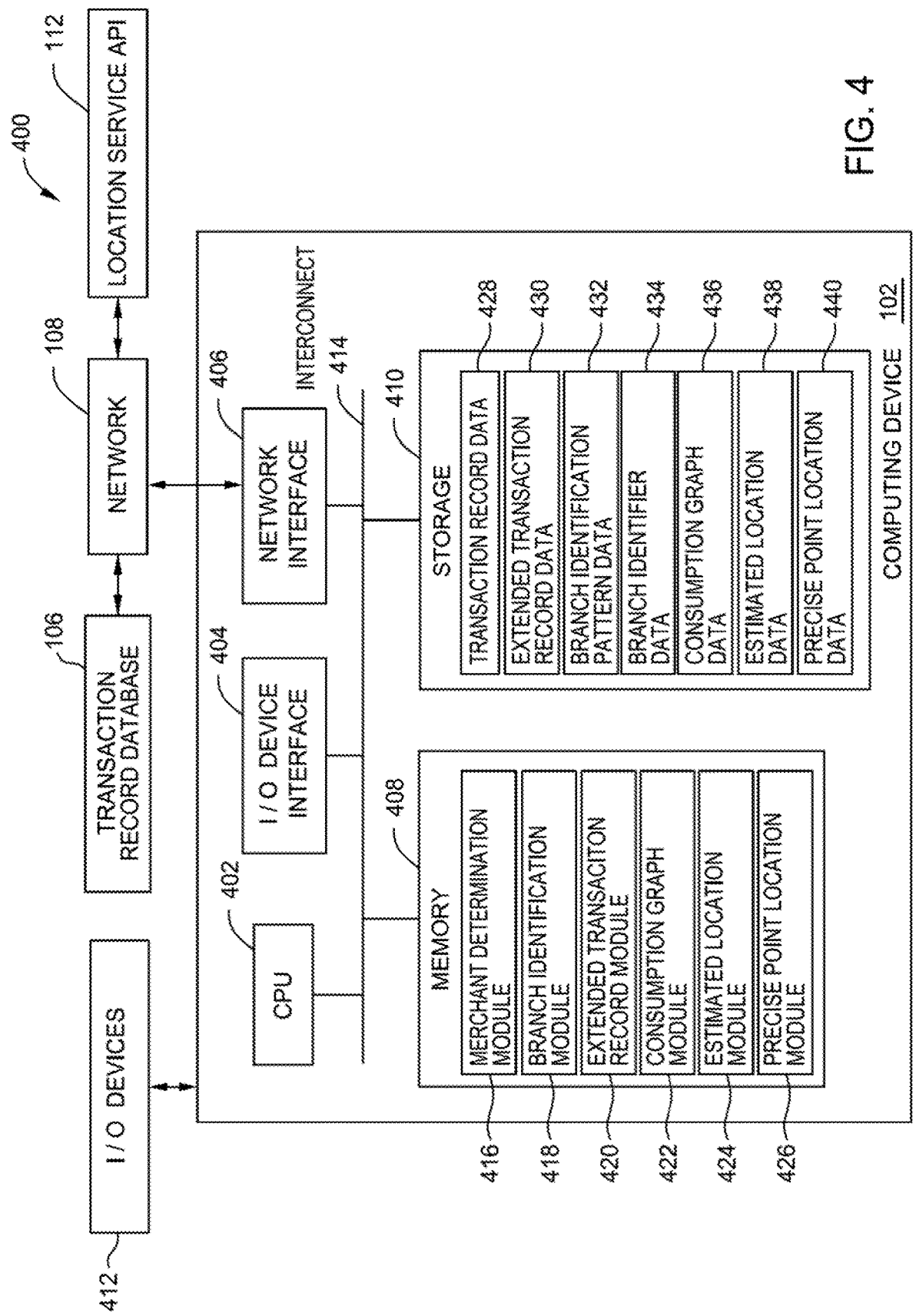
FIG. 4 depicts an example system for predicting a location based on transaction records, according to at least some embodiments.

FIG. 4 illustrates an example system 400 for determining a location based on transaction records. For example, the system 400 may be representative of computing device 102, as depicted and described with respect to FIG. 1. The computing device 102 may include a laptop computer, a desktop computer, a server, a tablet, and smartphone.

As shown, the computing device 102 includes a central processing unit (CPU) 402, one or more input/output (I/O) device interfaces 404 that may allow for the connection of various I/O devices 412 (e.g., keyboards, displays, mouse devices, pen input, etc.) to the computing device 102, network interface 406, a memory 408, a storage 410, and an interconnect 414. It is contemplated that one or more components of the system 400 may be located remotely and accessed via network 108. It is further contemplated that one or more components of the system 400 may comprise physical components or virtualized components.

CPU 402 may retrieve and execute programming instructions stored in the memory 408. The memory 408 may include a merchant determination module 416, a branch identification module 418, extended transaction record module 420, consumption graph module 422, estimated location module 424, and precise point location module 426. For example, CPU 402 may be configured to execute instructions and perform the method described above with respect to FIG. 2.

The merchant determination module 416 can determine a merchant associated with a transaction record. For example, the merchant determination module 416 can determine the merchant based on the merchant identifier in transaction record data 428 including the name of the merchant. The transaction record data 428 can be stored in storage 410. The transaction record data 428 can be retrieved via a network 108 from a transaction record database 106.

The branch identification module 418 can apply a branch identification pattern to transaction records associated with a determined merchant. The branch identification pattern can be retrieved from branch identification pattern data 432 from the storage 410. Upon applying the branch identification pattern to the transaction records, the branch identifier associated with the transaction record can be determined for the merchant. The determined branch identifier can be stored in storage 410 as branch identifier data 434.

The extended transaction record module 420 can retrieve the branch identifier data 434 stored in the storage 410 and append the respective transaction record. Appending the transaction record generates an extended transaction record. The extended transaction record is stored in the storage 410 as extended transaction record data 430.

The consumption graph module 422 can generate a consumption graph comprising at least of two or more nodes and one or more edges. The generated consumption graph can be displayed on a display of a computing device 102. The consumption graph can be stored in storage 410 as consumption graph data 436.

The estimated location module 424 can determine the estimated location information of an unknown location node of the consumption graph. The estimated location information can be determined based on shared number of customers between a known location node and an unknown location node. In one example, the estimated location information can be UTM grid coordinates based on the UTM grid coordinates of the known location nodes and the edges connecting each known location node to the unknown location node. In another example, the estimated location information determined by the estimated location module 424 can comprise a rough estimate such as a zip code, city, neighborhood, or landmark. The rough estimate can be determined based on the transaction records of known locations. The determined estimated location can be stored in storage 410 as estimated location data 438. Additionally, upon determining the estimated location information, the unknown location node can be classified as estimated location node.

The precise point location module 426 can determine the precise point location based on the estimated location data 438. The estimated location data 438 can be retrieved from storage 410. Using the estimated location data 438 as input and the merchant identification from the associated extended transaction records, the precise point location module 426 can query a location service API 112. For example, the precise point location module 426 can query Google maps API with the zip code and merchant identification as inputs. In another example, the precise point location module can query Google maps API with the UTM coordinates and merchant identification as inputs. The location service API 112 can generate, based on the inputs, a precise point location. Other estimated location inputs can include landmark, neighborhood, city, and state. The precise point location data 440 can be stored in storage 410. Additionally, upon determining the precise point location information, the estimated location node can be classified as a known location node.

The interconnect 414 transmits programming instructions, transaction records, and extended transaction records among the CPU 402, I/O device interface 404, network interface 406, memory 408, and storage 410. CPU 402 is included to be representative of a single CPU, multiple CPUs, and a single CPU having multiple processing cores. Additionally, the memory 408 is included to be representative of a random access memory. Furthermore, the storage 410 may be a disk drive, solid state drive, or a collection of storage devices distributed across multiple storage systems. Although shown as a single unit, the storage 410 may be a combination of fixed and/or removable storage devices, such as fixed disc drives, removable memory cards or optical storage, network attached storage (NAS), or a storage area-network (SAN). Storage 410 may comprise transaction record data 428, extended transaction record data 430, branch identification pattern data 432, branch identifier data 434, consumption graph data 436, estimated location data 438, and precise point location data 440.

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), and ascertaining. Also, "determining" may include receiving (e.g., receiving information) and accessing (e.g., accessing data in a memory). Also, "determining" may include resolving, selecting, choosing, and establishing.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, and power management circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for determining a location based on transaction data, comprising:
   obtaining a plurality of transaction records, wherein each transaction record includes a merchant identification and a description string;
   determining a merchant for each respective transaction record in the plurality of transaction records based on a respective merchant identification;
   generating, based on a plurality of description strings in the plurality of transaction records, one or more branch identification patterns for each merchant;
   creating a plurality of extended transaction records that includes a branch identifier for each extended transaction record in the plurality of extended transaction records, based on applying each branch identification pattern from the one or more branch identification patterns to the plurality of transaction records;
   creating a consumption graph based on the plurality of extended transaction records;
   determining an estimated location associated with one of the plurality of extended transaction records based on the consumption graph; and
   based on the estimated location, determining a precise point location.

2. The method of claim 1, wherein creating the consumption graph includes:
   defining a plurality of nodes, wherein each node in the plurality of nodes includes extended transaction records from the plurality of extended transaction records with the same merchant identification and branch identifier; and
   defining an edge between each unique pair of nodes in the plurality of nodes.

3. The method of claim 2, wherein determining the estimated location comprises:
   determining each node in the consumption graph with a known location that has an edge connecting to a node with an unknown location;
   determining, based on a statistical model, a distance corresponding to each connecting edge between each known location and the unknown location; and
   estimating the location of the node with the unknown location based on the distance associated with each connecting edge between each known location and the unknown location.

4. The method of claim 3, wherein the statistical model determines the distance based on a shared percentage of customers between each node in the unique pair of nodes.

5. The method of claim 2, wherein each edge in the consumption graph includes a weight value.

6. The method of claim 5, wherein the weight value is based on a number of edges connecting the node with the unknown location to each node with a known location.

7. The method of claim 5, wherein the weight value is based on a time factor.

8. A system, comprising:
   a processor; and
   a memory storing instructions, which when executed by the processor perform a method for determining a location based on transaction data comprising:
      obtaining a plurality of transaction records, wherein each transaction record includes a merchant identification and a description string;
      determining a merchant for each respective transaction record in the plurality of transaction records based on a respective merchant identification;
      generating, based on a plurality of description strings in the plurality of transaction records, one or more branch identification patterns for each merchant;
      creating a plurality of extended transaction records that includes a branch identifier for each extended transaction record in the plurality of extended transaction records, based on applying each branch identification pattern from the one or more branch identification patterns to the plurality of transaction records;

creating a consumption graph based on the plurality of extended transaction records;

determining an estimated location associated with one of the plurality of extended transaction records based on the consumption graph; and based on the estimated location, determining a precise point location.

9. The system of claim 8, wherein creating the consumption graph includes:

defining a plurality of nodes, wherein each node in the plurality of nodes includes extended transaction records from the plurality of extended transaction records with the same merchant identification and branch identifier; and defining an edge between each unique pair of nodes in the plurality of nodes.

10. The system of claim 9, wherein determining the estimated location comprises:

determining each node in the consumption graph with a known location that has an edge connecting to a node with an unknown location;

determining, based on a statistical model, a distance corresponding to each connecting edge between each known location and the unknown location; and estimating the location of the node with the unknown location based on the distance associated with each connecting edge between each known location and the unknown location.

11. The system of claim 10, wherein the statistical model determines the distance based on a shared percentage of customers between each node in the unique pair of nodes.

12. The system of claim 9, wherein each edge in the consumption graph includes a weight value.

13. The system of claim 12, wherein the weight value is based on a number of edges connecting the node with the unknown location to each node with a known location.

14. The system of claim 12, wherein the weight value is based on a time factor.

15. A non-transitory computer readable storage medium comprising instructions, which when executed by a processor of a computing device, cause the computing device to perform a method for determining a location based on transaction data comprising:

obtaining a plurality of transaction records, wherein each transaction record includes a merchant identification and a description string;

determining a merchant for each respective transaction record in the plurality of transaction records based on a respective merchant identification;

generating, based on a plurality of description strings in the plurality of transaction records, one or more branch identification patterns for each merchant;

creating a plurality of extended transaction records that includes a branch identifier for each extended transaction record in the plurality of extended transaction records, based on applying each branch identification pattern from the one or more branch identification patterns to the plurality of transaction records;

creating a consumption graph based on the plurality of extended transaction records;

determining an estimated location associated with one of the plurality of extended transaction records based on the consumption graph; and based on the estimated location, determining a precise point location.

16. The non-transitory computer readable storage medium of claim 15, wherein creating the consumption graph includes:

defining a plurality of nodes, wherein each node in the plurality of nodes includes extended transaction records from the plurality of extended transaction records with the same merchant identification and branch identifier; and defining an edge between each unique pair of nodes in the plurality of nodes.

17. The non-transitory computer readable storage medium of claim 16, wherein determining the estimated location comprises:

determining each node in the consumption graph with a known location that has an edge connecting to a node with an unknown location;

determining, based on a statistical model, a distance corresponding to each connecting edge between each known location and the unknown location; and estimating the location of the node with the unknown location based on the distance associated with each connecting edge between each known location and the unknown location.

18. The non-transitory computer readable storage medium of claim 17, wherein the statistical model determines the distance based on a shared percentage of customers between each node in the unique pair of nodes.

19. The non-transitory computer readable storage medium of claim 16, wherein each edge in the consumption graph includes a weight value.

20. The non-transitory computer readable storage medium of claim 19, wherein the weight value is based on a number of edges connecting the node with the unknown location to each node with a known location.

* * * * *